United States Patent
Qiu et al.

(10) Patent No.: US 12,493,186 B2
(45) Date of Patent: Dec. 9, 2025

(54) CONTROL METHOD FOR HEAD-MOUNTED DEVICE AND IMAGE RENDERING METHOD

(71) Applicant: GOERTEK INC., Shandong (CN)

(72) Inventors: Xudong Qiu, Shandong (CN); Hongyan Tao, Shandong (CN); Chao Zhang, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/552,240

(22) PCT Filed: Nov. 6, 2021

(86) PCT No.: PCT/CN2021/129158
§ 371 (c)(1),
(2) Date: Sep. 25, 2023

(87) PCT Pub. No.: WO2023/050533
PCT Pub. Date: Apr. 6, 2023

(65) Prior Publication Data
US 2024/0019702 A1    Jan. 18, 2024

(30) Foreign Application Priority Data
Sep. 29, 2021    (CN) .......................... 202111151283.6

(51) Int. Cl.
*G02B 27/01*    (2006.01)
*G06F 3/01*    (2006.01)
*G06F 3/147*    (2006.01)

(52) U.S. Cl.
CPC .......... *G02B 27/0172* (2013.01); *G06F 3/011* (2013.01); *G06F 3/147* (2013.01);
(Continued)

(58) Field of Classification Search
CPC .......... G06F 3/011; G06F 3/012; G06F 3/013; G06F 3/0346; G06F 3/016; G06F 3/017;
(Continued)

(56) References Cited

U.S. PATENT DOCUMENTS

| | | | |
|---|---|---|---|
| 2010/0091096 A1* | 4/2010 | Oikawa | G06T 7/73 348/E13.001 |
| 2015/0379772 A1* | 12/2015 | Hoffman | G02B 27/0093 345/633 |

(Continued)

FOREIGN PATENT DOCUMENTS

| | | | |
|---|---|---|---|
| CN | 103366391 A | 10/2013 | |
| CN | 105474273 A | 4/2016 | |

(Continued)

OTHER PUBLICATIONS

International Search Report from International Application No. PCT/CN2021/129158 mailed Jun. 23, 2022.

*Primary Examiner* — Dong Hui Liang
(74) *Attorney, Agent, or Firm* — Shih IP Law Group, PLLC

(57) ABSTRACT

Disclosed are a control method and apparatus for a head-mounted device, and a head-mounted device, as well as an image rendering method and apparatus, and an electronic device. The control method comprises: sending a rendering request containing posture data to a cloud server, and receiving a first rendered image, wherein the first rendered image is an image obtained by rendering in the cloud server based on the posture data; obtaining real posture change data from a first target time to a second target time, wherein the first target time is a time when the rendering request is sent, and the second target time is a time when the first rendered image is received; and performing rendering compensation on the first rendered image based on the posture change data to obtain a second rendered image.

8 Claims, 6 Drawing Sheets

(52) U.S. Cl.
CPC ............... *G02B 2027/014* (2013.01); *G02B 2027/0181* (2013.01); *G02B 2027/0198* (2013.01); *G09G 2370/022* (2013.01)

(58) Field of Classification Search
CPC ........ G06F 3/014; G06F 3/147; G06F 3/0304; G06F 3/041; G06F 3/0325; G06F 3/04845; G06F 1/163; G06F 1/1686; G06F 2203/012
See application file for complete search history.

(56) References Cited

U.S. PATENT DOCUMENTS

| | | | |
|---|---|---|---|
| 2016/0180495 A1* | 6/2016 | Thulasimani | G02B 27/017 345/545 |
| 2016/0282619 A1* | 9/2016 | Oto | A63F 13/25 |
| 2017/0345398 A1 | 11/2017 | Fuchs et al. | |
| 2018/0047332 A1* | 2/2018 | Kuwahara | G09G 3/2096 |
| 2018/0365882 A1* | 12/2018 | Croxford | G06T 7/20 |
| 2019/0073778 A1* | 3/2019 | Lee | G06T 7/30 |

FOREIGN PATENT DOCUMENTS

| | | |
|---|---|---|
| CN | 106919360 A | 7/2017 |
| CN | 106998409 A | 8/2017 |
| CN | 109741463 A | 5/2019 |
| CN | 110751711 A | 2/2020 |
| CN | 110868581 A | 3/2020 |
| CN | 111064981 A | 4/2020 |
| CN | 112380989 A | 2/2021 |
| CN | 213461894 U | 6/2021 |

\* cited by examiner

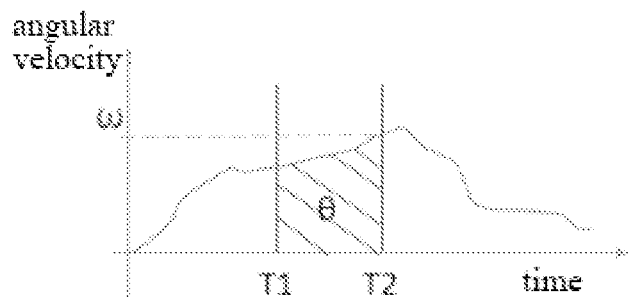

Fig. 3

```
┌─────────────────────────────────────────────────────────────────┐
│ sending a rendering request containing posture data to the cloud, and │  S201
│ receiving a first rendered image, wherein the first rendered image is │
│ an image obtained by rendering in the cloud based on the posture data │
└─────────────────────────────────────────────────────────────────┘
                                    │
                                    ▼
┌─────────────────────────────────────────────────────────────────┐
│ recording real angular velocity data from the first target time to the │  S202
│ second target time and conducting integral operation on the angular │
│ velocity data to obtain the rotation angle of the head-mounted device │
│         from the first target time to the second target time         │
└─────────────────────────────────────────────────────────────────┘
                                    │
                                    ▼
┌─────────────────────────────────────────────────────────────────┐
│   calculating a rotation matrix based on the rotation angle, and    │  S203
│  adjusting the first rendered image using the rotation matrix to obtain │
│    the second rendered image, wherein the first rendered image has the │
│      same image content range as the second rendered image.        │
└─────────────────────────────────────────────────────────────────┘
                                    │
                                    ▼
┌─────────────────────────────────────────────────────────────────┐
│   performing ATW compensation on the second rendered image to     │  S204
│  obtain a third rendered image, wherein the third rendered image is │
│    displayed through the head-mounted device at a third target time │
└─────────────────────────────────────────────────────────────────┘
```

Fig. 4

CONTROL METHOD FOR HEAD-MOUNTED DEVICE AND IMAGE RENDERING METHOD

This application claims priority and benefits from Chinese Patent Application No. 202111151283.6, titled "CONTROL METHOD FOR HEAD-MOUNTED DEVICE AND IMAGE RENDERING METHOD", filed on Sep. 29, 2021, which is incorporated by reference as if fully set forth herein.

TECHNICAL FIELD

The present disclosure relates to the technical field of virtual reality, particularly, to a control method and apparatus for a head-mounted device, a head-mounted device, and a computer-readable storage medium, and relates to an image rendering method and apparatus, an electronic device, and a computer-readable storage medium.

BACKGROUND ART

Streaming technology is a technology that uses real-time video compression and transmission through the network, the core of which is to store applications, data processing and data on the server side and users can access the applications and data on the server side through the head-mounted device, to realize a large server type head-mounted device.

In related art, the head-mounted device performs asynchronous time warp (ATW) compensation on the rendered image received from the server. That is, the user's posture change between a time when the head-mounted device receives the rendered image and a time when the image is displayed is predicted based on user's historical posture data and then the rendering compensation is performed. However, the network transmission between the head-mounted device and the server and the image rendering also take time. The related art does not take the user's posture changes during this period into account, resulting in poor accuracy of rendering compensation.

Therefore, it is a problem to be solved in the art to improve the accuracy of rendering compensation.

SUMMARY

An object of the present disclosure is to provide a control method and apparatus for a head-mounted device, an electronic device, and a computer-readable storage medium to improve the accuracy of rendering compensation.

In order to achieve the above object, the present disclosure provides a control method for a head-mounted device, which is applied to the head-mounted device, the method including: sending a rendering request containing posture data to a cloud server, and receiving a first rendered image, wherein the first rendered image is an image obtained by rendering in the cloud server based on the posture data; obtaining real posture change data from a first target time to a second target time, wherein the first target time is a time when the rendering request is sent, and the second target time is a time when the first rendered image is received; and performing rendering compensation on the first rendered image based on the posture change data to obtain a second rendered image.

In an embodiment, the method further includes performing ATW compensation on the second rendered image to obtain a third rendered image, and displaying the third rendered image through the head-mounted device at a third target time.

In an embodiment, specifically, the posture change data is a rotation angle of the head-mounted device from the first target time to the second target time, and obtaining real posture change data from the first target time to the second target time includes recording real angular velocity data from the first target time to the second target time and conducting integral operation on the angular velocity data to obtain the rotation angle of the head-mounted device from the first target time to the second target time.

In an embodiment, performing rendering compensation on the first rendered image based on the posture change data to obtain the second rendered image includes calculating a rotation matrix based on the rotation angle, and adjusting the first rendered image using the rotation matrix to obtain the second rendered image, wherein the first rendered image has the same image content range as that of the second rendered image.

In an embodiment, the first rendered image is an image obtained by rendering in the cloud server based on an expanded image content range, and the expanded image content range is a range obtained by expanding an image content range corresponding to the posture data.

Accordingly, performing rendering compensation on the first rendered image based on the posture change data to obtain the second rendered image includes determining a target image content range based on the posture data and the rotation angle and extracting the second rendered image from the first rendered image according to the target image content range.

In an embodiment, the expanded image content range is a range obtained by expanding the image content range corresponding to the posture data by a target length in each direction.

In an embodiment, the target length is a length calculated according to a maximum delay between the head-mounted device and the cloud server, a maximum rotation speed of the head-mounted device and a rendering speed of the cloud server.

In order to achieve the above object, the present disclosure provides an image rendering method, which is applied in a cloud server, the method including: receiving a rendering request sent from a head-mounted device, and determining an image content range corresponding to posture data in the rendering request; obtaining an expanded image content range by expanding the image content range, and obtaining a first rendered image by rendering based on the expanded image content range; and sending the first rendered image to the head-mounted device, so that the head-mounted device performs rendering compensation on the first rendered image to obtain a second rendered image.

In an embodiment, obtaining the expanded image content range by expanding the image content range includes expanding the image content range by the target length in each direction to obtain the expanded image content range.

In an embodiment, the method further includes calculating the target length according to a maximum delay between the head-mounted device and the cloud server, a maximum rotation speed of the head-mounted device and a rendering speed of the cloud server.

In order to achieve the above object, the present disclosure provides a control apparatus for a head-mounted device, which is applied to the head-mounted device, the apparatus including: a receiving module for sending a rendering request containing posture data to a cloud server and receiving a first rendered image, wherein the first rendered image is an image obtained by rendering in the cloud server based on the posture data; an acquisition module for obtaining real posture change data from a first target time to a second target time, wherein the first target time is a time when the rendering request is sent, and the second target time is a time when the first rendered image is received; and a rendering compensation module for performing rendering compensation on the first rendered image based on the posture change data to obtain a second rendered image.

In order to achieve the above object, the present disclosure provides an image rendering apparatus, which is applied in a cloud server, the apparatus including: a determination module for receiving a rendering request sent from a head-mounted device, and determining an image content range corresponding to posture data in the rendering request; a rendering module for expanding the image content range to obtain an expanded image content range, and rendering based on the expanded image content range to obtain a first rendered image; and a sending module for sending the first rendered image to the head-mounted device, so that the head-mounted device performs rendering compensation on the first rendered image to obtain a second rendered image.

In order to achieve the above object, the present disclosure provides a head-mounted device including: a memory for storing a computer program; and a processor for implementing the steps of the control method for a head-mounted device as described above when executing the computer program.

In order to achieve the above object, the present disclosure provides a computer-readable storage medium, on which a computer program is stored, and when the computer program is executed by a processor, the steps of the control method for a head-mounted device as described above are realized.

In order to achieve the above object, the present disclosure provides an electronic device including: a memory for storing a computer program; and a processor for implementing the steps of the image rendering method as described above when executing the computer program.

In order to achieve the above object, the present disclosure provides a computer-readable storage medium, on which a computer program is stored, and when the computer program is executed by a processor, the steps of the image rendering method as described above are realized.

According to the above technical solution of the present disclosure, a control method for a head-mounted device includes: sending a rendering request containing posture data to a cloud server, and receiving a first rendered image, wherein the first rendered image is an image obtained by rendering in the cloud server based on the posture data; obtaining real posture change data from a first target time to a second target time, wherein the first target time is a time when the rendering request is sent, and the second target time is a time when the first rendered image is received; and performing rendering compensation on the first rendered image based on the posture change data to obtain a second rendered image.

According to the control method for a head-mounted device provided by the present disclosure, real posture change data of the head-mounted device between the time when the rendering request is sent and the time when the first rendered image is received are recorded, and based on this, a rotation angle of the head-mounted device from the time when the first rendered image is received relative to the time when the rendering request is sent is calculated, and based on the posture change data, the rendering compensation on the first rendered image is performed to obtain a second rendered image, thereby, delay recognized by the user is reduced. It can be known, in the control method for a head-mounted device provided by the present disclosure, the network transmission between the head-mounted device and the cloud server and user's posture changes in the process of cloud server image rendering are counted in, and the rendering compensation is performed based on this, so that the accuracy of rendering compensation is improved. The present disclosure also provides a control apparatus for a head-mounted device, a head-mounted device, and a computer-readable storage medium, which can also realize the above technical effects. The present disclosure also provides an image rendering method, device, an electronic device, and a computer-readable storage medium, which can also realize the above technical effects.

It should be understood, the above general description and the following detailed description are only illustrative and do not limit the present disclosure.

BRIEF DESCRIPTION OF THE DRAWINGS

In order to explain the technical solutions of the embodiments of the present disclosure or in the prior art more clearly, the following will briefly illustrate the accompanying drawings required for the description of the embodiments or the prior art. Obviously, the drawings in the following description are only some embodiments of the present disclosure, and for those skilled in the art, other drawings can be obtained according to the drawings without paying creative labor. The accompanying drawings are intended to provide a further understanding of the disclosure and form a part of the specification, and to explain the disclosure together with the following specific embodiments, but do not constitute a limitation on the disclosure.

FIG. 3 is a schematic diagram showing the corresponding relationship between angular velocity and time according to an exemplary embodiment.

FIG. 4 is a flowchart of a second control method for the head-mounted device according to an exemplary embodiment.

DETAILED DESCRIPTION OF THE EMBODIMENTS

The technical solutions in the embodiments of the present disclosure will be described below in combination with the accompanying drawings. Obviously, the described embodiments are only part of the embodiments of the present disclosure, rather than all the embodiments. Based on the embodiments in the present disclosure, all other embodiments obtained by those skilled in the art without paying creative labor fall within the protection scope of the present disclosure. In addition, in the embodiments of the present disclosure, terms such as "first" and "second" are used to distinguish similar objects, not necessarily to describe a specific order or sequence.

Figure 1:
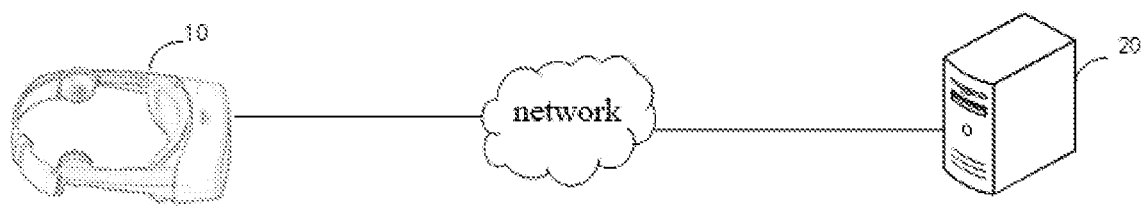
FIG. 1 is an architecture diagram of a control system for a head-mounted device according to an exemplary embodiment.

In order to facilitate the understanding of the display method according to the present disclosure, a system used for the method is described below. FIG. 1 shows an architecture diagram of a display system provided by an embodiment of the present disclosure. As shown in FIG. 1, the system includes a head-mounted device 10 and a cloud server 20, which are connected through a network.

The embodiment adopts cloud streaming technology, and does not need to download and install an application to the head-mounted device 10. Streaming software are used to run the application in the cloud server 20, the cloud server 20 sends the compressed data to the head-mounted device 10 through streaming protocol and processes the interactive data uploaded by the head-mounted device 10, so that users can access the applications and data on the server side through the head-mounted device 10.

Specifically, the cloud server 20, as a server for storing applications and data computing, integrates content service, control service, etc., and provides various data computing and processing capabilities, including decompression and compression of downlink and uplink data, and response to the request of the head-mounted device 10.

The head-mounted device 10 serves as an input and display device, providing users with an undifferentiated experience without sensing whether the running application exists locally or in the cloud server. The head-mounted device 10 is provided with a display device thereon, which may include a head mounted display (HMD) including a display image, a processor, a sensor, a camera, a wireless communication module, a storage, a battery, a lens, and other hardware, mainly responsible for collecting head posture data and displaying rendering results of the cloud server 20. In addition, the head-mounted device 10 is provided with an inertial measurement unit (IMU) thereon for measuring the head posture data such as a three-axis posture angle, an angular velocity, an acceleration, etc.

The embodiment of the present disclosure discloses a control method for a head-mounted device, which improves the accuracy of rendering compensation.

Figure 2:
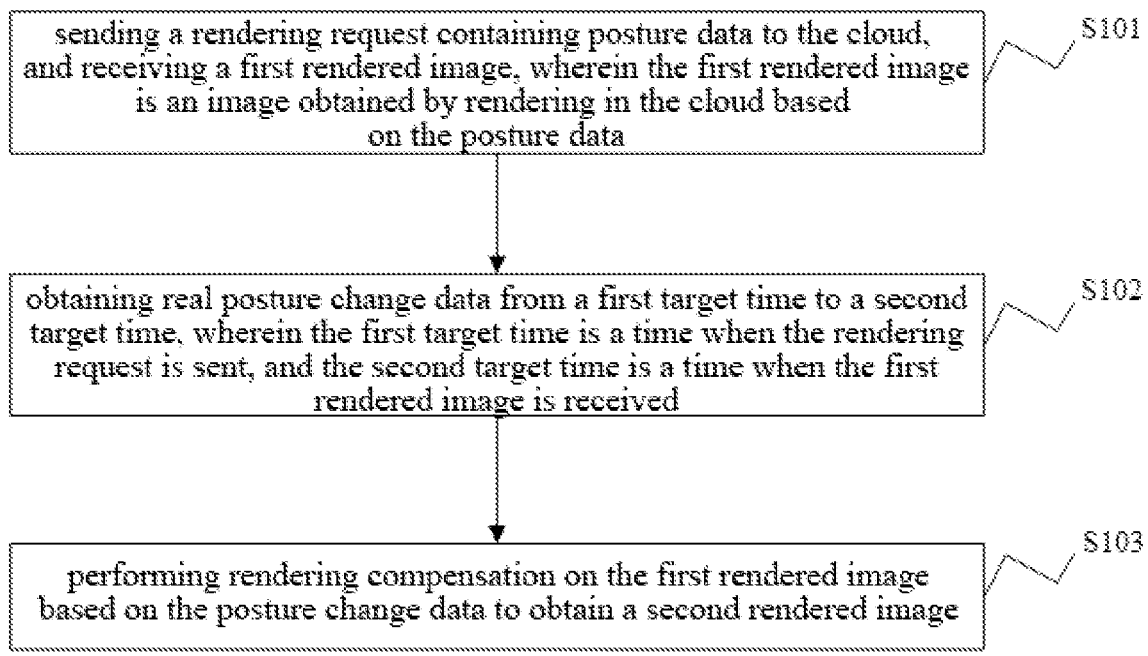
FIG. 2 is a flowchart of a first control method for the head-mounted device according to an exemplary embodiment.

Referring to FIG. 2, FIG. 2 is a flowchart of a first control method for the head-mounted device according to an exemplary embodiment. As shown in FIG. 2, the method includes the following steps.

S101, sending a rendering request containing posture data to the cloud server, and receiving a first rendered image. Herein, the first rendered image is an image obtained by rendering in the cloud server based on the posture data.

The embodiment is performed for the head-mounted device as described in the above embodiment. In a specific embodiment, the posture data is collected, and a rendering request is sent to the cloud server, and the cloud server renders based on the posture data to obtain the first rendered image, which is sent back to the head-mounted device.

S102, obtaining real posture change data from a first target time to a second target time. Herein, the first target time is a time when the rendering request is sent, and the second target time is a time when the first rendered image is received.

It will be understood that, in an ideal situation, the posture data sent from the head-mounted device to the cloud server is real-time posture data, but in a real situation, network transmission and image rendering both take time, so the first rendered image received by the head-mounted device is an image corresponding to the time when the rendering request is sent, rather than an actual image corresponding to the time when the first rendered image is received. Therefore, in this embodiment, the head-mounted device records the posture data between the time when the rendering request is sent and the time when the first rendered image is received, and calculates the posture change data based on the recorded posture data, so that rendering compensation can be performed in subsequent steps.

As a preferred embodiment, specifically, the posture change data is a rotation angle of the head-mounted device from the first target time to the second target time, and this step may include: recording a real angular velocity data from the first target time to the second target time, and integrating the angular velocity data to obtain a rotation angle of the head-mounted device from the first target time to the second target time. In a specific embodiment, as shown in FIG. 3, the corresponding relationship between the angular velocity and time is recorded. Herein, T1 is the first target time, i.e., the time when the rendering request is sent, and T2 is the second target time, that is, the time when the first rendered image is received, and the angular velocity between T1 and T2 is integrated to obtain a rotation angle θ.

S103, performing rendering compensation on the first rendered image based on the posture change data to obtain a second rendered image.

In a specific embodiment, the head-mounted device performs rendering compensation on the first rendered image based on the posture change data to obtain a second rendered image.

As a preferred embodiment, the embodiment also includes: performing ATW compensation on the second rendered image to obtain a third rendered image, and displaying the third rendered image through the head-mounted device at the third target time. It should be noted that the third target time is a time when the head-mounted device displays the rendered image, there is still a time difference between the second target time and the third target time, and ATW is used to compensate for user's posture change during this period. That is, the user's posture data at the third target time is predicted according to the user's posture data at the second target time, and then the second rendered image is compensated again.

According to the control method for a head-mounted device provided by the present disclosure, real posture change data of the head-mounted device between the time when the rendering request is sent and the time when the first rendered image is received are recorded, and based on this, a rotation angle of the head-mounted device from the time when the first rendered image is received relative to the time when the rendering request is sent is calculated, and based on the posture change data, the rendering compensation on the first rendered image is performed to obtain a second rendered image, thereby, delay recognized by the user is reduced. It can be known, in the control method for a head-mounted device provided by the present disclosure, the network transmission between the head-mounted device and the cloud server and user's posture changes in the process of cloud server image rendering are counted in, and the rendering compensation is performed based on this, so that the accuracy of rendering compensation is improved.

The embodiment of the present disclosure discloses a control method for a head-mounted device, and compared with the above embodiment, the embodiment further describes and optimizes the technical solution.

Specifically, referring to FIG. 4, FIG. 4 is a flowchart of a second control method for the head-mounted device according to an exemplary embodiment. As shown in FIG. 4, the method includes the following steps.

S201, sending a rendering request containing posture data to the cloud server, and receiving a first rendered image. Herein, the first rendered image is an image obtained by rendering in the cloud server based on the posture data.

In the embodiment, the cloud server determines a corresponding rendering range based on the received posture data, and renders based on this to obtain the first rendered image. That is, the first rendered image is a real image corresponding to the time when the rendering request is sent.

S202, recording real angular velocity data from the first target time to the second target time and conducting integral operation on the angular velocity data to obtain the rotation angle of the head-mounted device from the first target time to the second target time.

S203, calculating a rotation matrix based on the rotation angle, and adjusting the first rendered image using the rotation matrix to obtain the second rendered image. Herein, the first rendered image has the same image content range as that of the second rendered image.

In this step, the rotation matrix is adjusted based on the calculated rotation angle, and the angle of the first rendered image is changed using the rotation matrix to obtain the second rendered image. That is, the image content range of the first rendered image and the second rendered image are the same, but their angles are different, which results in a rotation in the visual effect, and can be understood as adjusting the position and angle in the virtual scene of the head-mounted device.

S204, performing ATW compensation on the second rendered image to obtain a third rendered image, and displaying the third rendered image through the head-mounted device at a third target time.

It can be known, in the embodiment, the displayed second rendered image can be obtained by simply changing the angle of the first rendered image using the rotation matrix, and it does not need a complex operation while having a visual rotation effect, thereby improving the efficiency of rendering compensation.

The embodiment of the present disclosure discloses a control method for a head-mounted device, and compared with the first embodiment, the embodiment further describes and optimizes the technical solution.

Figure 5:
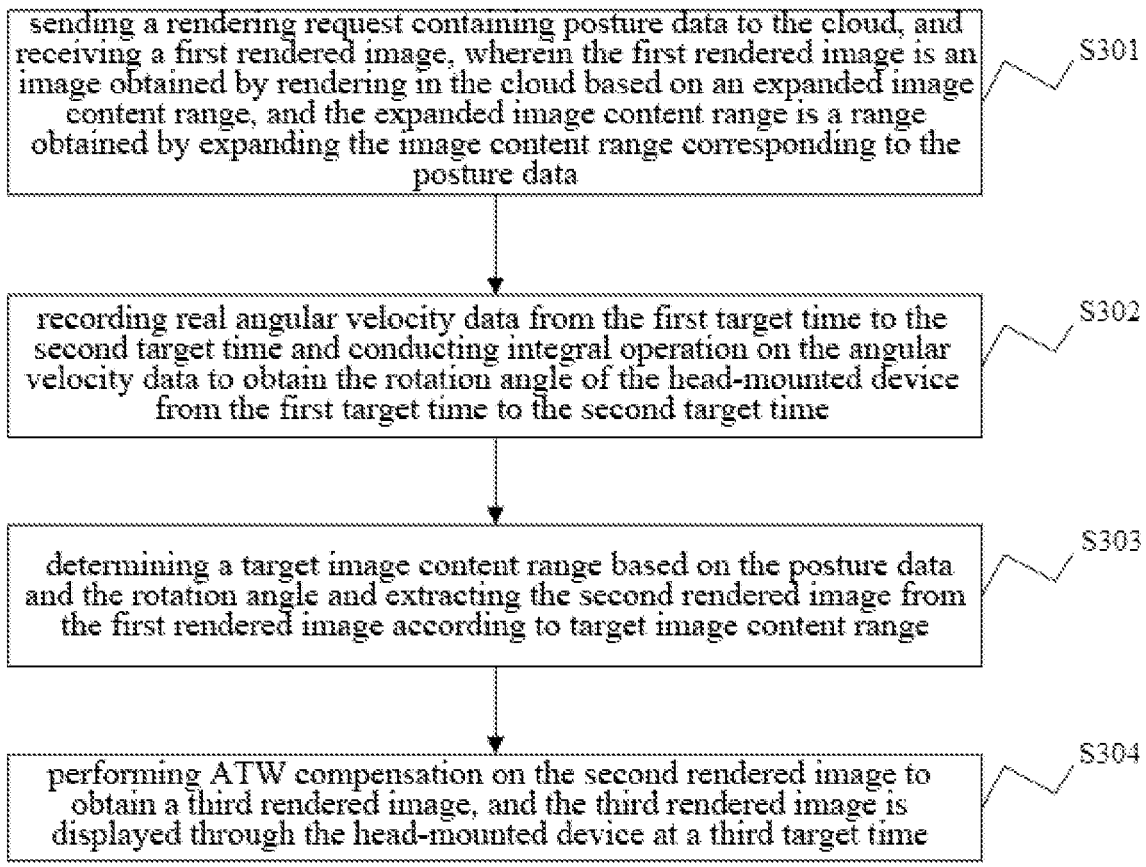
FIG. 5 is a flowchart of a third control method for the head-mounted device according to an exemplary embodiment.

Specifically, referring to FIG. 5, FIG. 5 is a flowchart of a third control method for the head-mounted device according to an exemplary embodiment. As shown in FIG. 5, the method includes the following steps.

S301, sending a rendering request containing posture data to the cloud server, and receiving a first rendered image. Herein, the first rendered image is an image obtained by rendering in the cloud server based on an expanded image content range, and the expanded image content range is a range obtained by expanding an image content range corresponding to the posture data.

In this embodiment, the cloud server determines a corresponding rendering range based on the received posture data, expands it to obtain the expanded image content range, and renders the expanded image to obtain the first rendered image. That is, the image content range of the first rendered image is larger than the real image corresponding to the time when the rendering request is sent.

Figure 6:
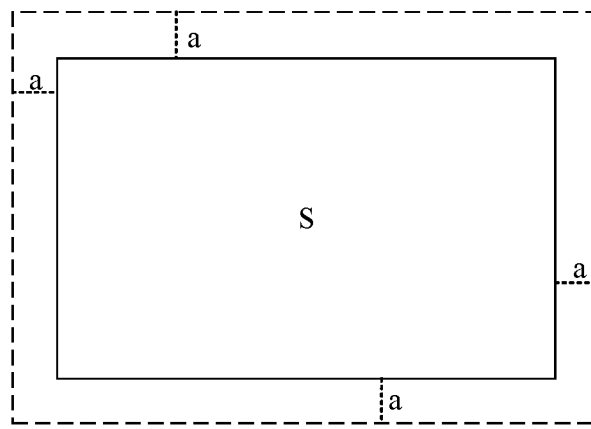
FIG. 6 is a schematic diagram showing an expanded image content range according to an exemplary embodiment.

As a preferred embodiment, the expanded image content range is a range obtained by expanding the image content range corresponding to the posture data by a target length in each direction. In a specific embodiment, the image content range corresponding to the posture data is extended by the target length upward, downward, leftward, and rightward to obtain an extended rendering range. For example, as shown in FIG. 6, the image content range corresponding to the posture data is S, the solid line portion in the figure, the target length is a, and the expanded image content range is the dotted line part in the figure.

Preferably, the target length is a length calculated according to the maximum delay between the head-mounted device and the cloud server, the maximum rotation speed of the head-mounted device and a rendering speed of the cloud server. In a specific embodiment, a time difference between the second target time and the first target time is calculated according to the maximum delay between the head-mounted device and the cloud server and the rendering speed of the cloud server, and the product of the time difference and the maximum rotation speed of the head-mounted device is mapped to the image to obtain the maximum rotation range of the head-mounted device within the maximum delay and cloud server rendering time, that is, the target length.

S302, recording real angular velocity data from the first target time to the second target time and conducting integral operation on the angular velocity data to obtain the rotation angle of the head-mounted device from the first target time to the second target time.

S303, determining a target image content range based on the posture data and the rotation angle and extracting the second rendered image from the first rendered image according to the target image content range.

In this step, the range of rendering compensation is determined based on the rotation angle, a sum with the image content range corresponding to the collected posture data is a target image content range. According to the target image content range, a second rendered image is obtained by extracting from the first rendered image. That is, the second rendered image is a real image corresponding to the time when the head-mounted device receives the first rendered image.

S304, performing ATW compensation on the second rendered image to obtain a third rendered image, and displaying the third rendered image through the head-mounted device at a third target time.

In the embodiment, the first rendered image in the cloud server is larger than the real image corresponding to the time when the rendering request is sent, and the head-mounted device extracts the second rendered image from the first rendered image based on the rotation angle, and thus rendering compensation is implemented. It can be known, the second rendered image is the real image corresponding to the time when the head-mounted device receives the first rendered image, which improves the efficiency of rendering compensation.

The embodiment below describes the process of cloud server image rendering.

Figure 7:
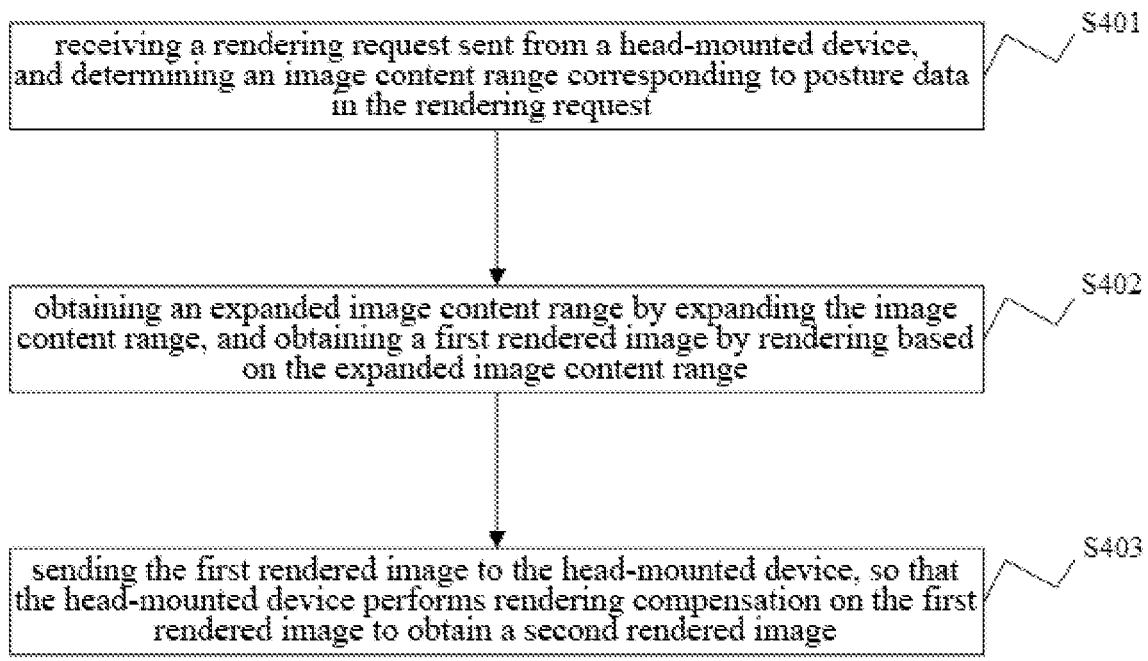
FIG. 7 is a flowchart of an image rendering method according to an exemplary embodiment.

Specifically, referring to FIG. 7, FIG. 7 is a flowchart of an image rendering method according to an exemplary embodiment. As shown in FIG. 7, including the following steps.

S401, receiving a rendering request sent from a head-mounted device, and determining an image content range corresponding to posture data in the rendering request.

The main steps of this embodiment are performed in the cloud server, and in this step, the cloud server determines the corresponding image content range based on the received posture data.

S402, obtaining an expanded image content range by expanding the image content range, and obtaining a first rendered image by rendering based on the expanded image content range.

In this step, the cloud server expands the image content range determined in the previous step to obtain an expanded image content range, and renders based on this to obtain a first rendered image. That is, the image content range of the first rendered image is larger than the real image corresponding to the time when the rendering request is sent.

As a preferred embodiment, obtaining an expanded image content range by expanding the image content range includes expanding the image content range by a target length in each direction to obtain the expanded image content range. Preferably, the embodiment also includes: obtaining an expanded image content range by expanding the image content range includes expanding the image content range by a target length in each direction to obtain the expanded image content range.

S403, sending the first rendered image to the head-mounted device, so that the head-mounted device performs rendering compensation on the first rendered image to obtain a second rendered image.

The following describes a control apparatus for a head-mounted device provided by the embodiment of the present disclosure. The control apparatus for a head-mounted device described below and the control method for a head-mounted device described above may correspond to each other.

Figure 8:
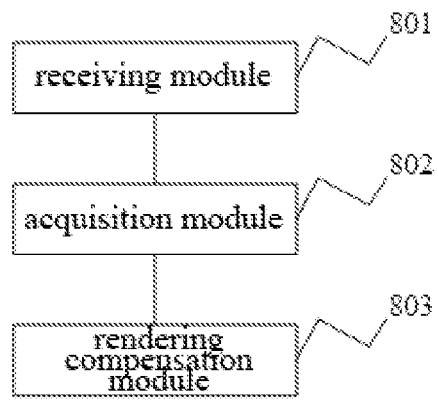
FIG. 8 is a structural diagram of a control apparatus for a head-mounted device according to an exemplary embodiment.

Referring to FIG. 8, FIG. 8 is a structural diagram of a control apparatus for a head-mounted device according to an exemplary embodiment. As shown in FIG. 8, the control apparatus includes the following modules.

A receiving module 801 for sending a rendering request containing posture data to the cloud server and receiving a first rendered image. Herein, the first rendered image is an image obtained by rendering in the cloud server based on the posture data.

An acquisition module 802 for obtaining real posture change data from a first target time to a second target time. Herein, the first target time is a time when the rendering request is sent, and the second target time is a time when the first rendered image is received.

A rendering compensation module 803 for performing rendering compensation on the first rendered image based on the posture change data to obtain a second rendered image.

According to the control apparatus for a head-mounted device provided by the present disclosure, real posture change data of the head-mounted device between the time when the rendering request is sent and the time when the first rendered image is received are recorded, and based on this, a rotation angle of the head-mounted device from the time when the first rendered image is received relative to the time when the rendering request is sent is calculated, and based on the posture change data, the rendering compensation on the first rendered image is performed to obtain a second rendered image, thereby, delay recognized by the user is reduced. It can be known, in the control apparatus for a head-mounted device provided by the present disclosure, the network transmission between the head-mounted device and the cloud server and user's posture changes in the process of cloud server image rendering are counted in, and the rendering compensation is performed based on this, so that the accuracy of rendering compensation is improved.

Based on the above embodiment, as a preferred embodiment, the control apparatus further includes:

A display module for performing ATW compensation on the second rendered image to obtain a third rendered image, and displaying the third rendered image through the head-mounted device at a third target time.

Based on the above embodiments, as a preferred embodiment, specifically, the posture change data is a rotation angle of the head-mounted device from the first target time to the second target time, and specifically, the acquisition module 802 is a module for recording a real angular velocity data from the first target time to the second target time, and integrating the angular velocity data to obtain a rotation angle of the head-mounted device from the first target time to the second target time.

Based on the above embodiments, as a preferred embodiment, specifically, the rendering compensation module 803 is a module for calculating a rotation matrix based on the rotation angle, and adjusting the first rendered image using the rotation matrix to obtain the second rendered image. Herein, the first rendered image has the same image content range as that of the second rendered image.

Based on the above embodiments, as a preferred embodiment, the first rendered image is an image obtained by rendering in the cloud server based on an expanded image content range, and the expanded image content range is a range obtained by expanding the image content range corresponding to the posture data.

Correspondingly, specifically, the rendering compensation module 803 is a module for determining a target image content range based on the posture data and the rotation angle and extracting the second rendered image from the first rendered image according to the target image content range.

Based on the above embodiments, as a preferred embodiment, the expanded image content range is a range obtained by expanding the image content range corresponding to the posture data by a target length in each direction.

Based on the above embodiments, as a preferred embodiment, the target length is a length calculated according to the maximum delay between the head-mounted device and the cloud server, the maximum rotation speed of the head-mounted device and a rendering speed of the cloud server.

The following describes an image rendering apparatus provided by the embodiment of the present disclosure, which is applied in the cloud server. The image rendering apparatus described below and the image rendering method described above can be referred to each other.

Figure 9:
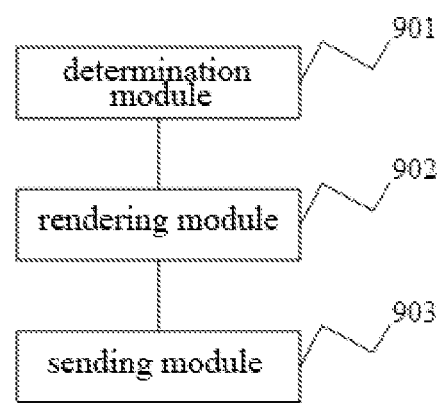
FIG. 9 is a structural diagram of an image rendering apparatus according to an exemplary embodiment.

Referring to FIG. 9, FIG. 9 is a structural diagram of an image rendering apparatus according to an exemplary embodiment. As shown in FIG. 9, the image rendering apparatus includes the following modules.

A determination module 901 for receiving a rendering request sent from a head-mounted device, and determining an image content range corresponding to posture data in the rendering request.

A rendering module 902 for expanding the image content range to obtain an expanded image content range, and rendering based on the expanded image content range to obtain a first rendered image.

A sending module 903 for sending the first rendered image to the head-mounted device, so that the head-mounted device performs rendering compensation on the first rendered image to obtain a second rendered image.

Based on the above embodiment, as a preferred embodiment, specifically, the rendering module 902 is a module for expanding the image content range by a target length in each direction to obtain the expanded image content range.

Based on the above embodiment, as a preferred embodiment, the image rendering apparatus further includes the following modules.

A calculation module for calculating the target length according to the maximum delay between the head-mounted device and the cloud server, the maximum rotation speed of the head-mounted device and the rendering speed of the cloud server.

As for the apparatus in the above embodiments, the specific embodiment for each module to perform operation has been described in detail in the embodiments of the method, and will not be described in detail herein.

Figure 10:
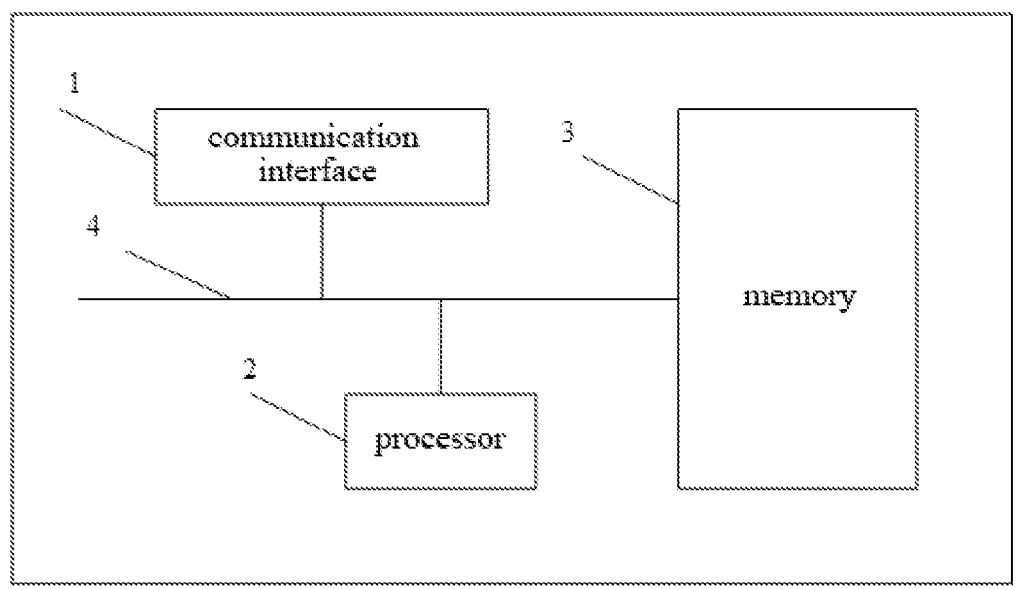
FIG. 10 is an internal structure diagram for a head-mounted device or an electronic device according to an exemplary embodiment.

Based on the hardware implementation of the above program modules, and in order to implement the embodiments of the present disclosure, the present disclosure also provides a head-mounted device and an electronic device. FIG. 10 is an internal structure diagram for a head-mounted device or an electronic device according to an exemplary embodiment. As shown in FIG. 10, the device includes the following components.

A communication interface 1 for exchanging information with other devices such as a network device.

A processor 2 connected with the communication interface 1 to realize information interaction with other devices, and used to execute the control method for a head-mounted device or the image rendering method provided by one or more technical solutions when running a computer program. Herein, the computer program is stored on a memory 3.

Of course, in practical situations, various components are coupled together through a bus system 4. It will be understood, the bus system 4 is used to realize connection communication between these components. The bus system 4 includes a power bus, a control bus and a status signal bus in addition to a data bus. However, for the sake of clarity, various buses are shown as the bus system 4 in FIG. 10.

The memory 3 in the embodiment of the present disclosure is used to store various types of data to support the operation of the head-mounted device or the electronic device. Examples of such data include any computer program used to operate on a head-mounted device or an electronic device.

It will be understood that the memory 3 may be a volatile memory or a non-volatile memory, and may also include both volatile and non-volatile memories. The non-volatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disk, or a compact disc read-only memory (CD-ROM). The magnetic surface memory may be a disk memory or a tape memory. The volatile memory may be a random access memory (RAM), which is used as an external cache. By way of illustration but not limitation, many forms of RANI are available, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). The processor 2 described in the embodiment of the present disclosure is intended to include, but not limited to, these and any other suitable types of memory.

The method disclosed in the embodiments of the present disclosure may be applied to or implemented by the processor 2. The processor 2 may be an integrated circuit chip with signal processing capability. In the implementation process, each step of the above method may be completed by an integrated logic circuit of hardware or instructions in the form of software. The above processor 2 may be a general processing unit, a DSP, or other programmable logic devices, discrete gates or transistor logic devices, discrete hardware components, etc. The processor 2 may implement or execute the methods, steps and logic block diagrams disclosed in the embodiments of the present disclosure. The general processing unit may be a microprocessor or any conventional processors. The steps of the method disclosed in combination with the embodiments of the present disclosure may be directly embodied by a hardware decoding processor or a combination of hardware and software modules in the decoding processor. The software modules may be stored in a storage medium, which is disposed in the memory 3, the processor 2 reads the program in the memory 3 and the steps of the above method may be completed in combination with the hardware.

When the program is executed by the processor 2, corresponding processes in the methods in the embodiments of the present disclosure are implemented, and for the sake of concise, it will not be repeated herein.

In an exemplary embodiment, the embodiment of the present disclosure also provides a storage medium. That is, a computer storage medium, specifically a computer-readable storage medium. For example, the storage medium includes a memory 3 for storing computer programs, which can be executed by a processor 2 to complete the steps of the aforementioned method. The computer-readable storage medium may be a memory such as FRAM, a ROM, a PROM, an EPROM, an EEPROM, a Flash Memory, a magnetic surface memory, an optical disk, or a CD-ROM.

Those skilled in the art may understand that all or part of the steps of the above method in the embodiments may be completed through hardware related to program instructions, the above program may be stored in a computer-readable storage medium, and when the program is executed, the steps of the above method in the embodiments are performed. The above storage medium includes a removable storage device, a ROM, a RAM, a magnetic disc, an optical disc or other media that can store program code.

Or, if the integrated unit of the present disclosure is realized in the form of software functional modules and sold or used as an independent product, it may also be stored in a computer-readable storage medium. Based on this, the technical solution of the embodiments of the present disclosure, in essence, or a part thereof that contributes to the prior art, may be embodied in the form of a software product, the computer software product is stored in a storage medium and includes several instructions to enable an electronic device (a personal computer, a server, a network device, etc.) to execute all or part of the method described in various embodiments of the present disclosure. The above storage medium includes a removable storage device, a ROM, a RAM, a magnetic disc, an optical disc or other media that can store program code.

The above is only specific embodiments of the present disclosure, and the protection scope of the present disclosure is not limited thereto. Those skilled in the art may easily conceive changes or replacements within the technical scope disclosed in the present disclosure and the changes or replacements should be understood as being included in the protection scope of the present disclosure. Therefore, the protection scope of the present disclosure shall be interpreted based on the protection scope of the claims.

What is claimed is:

1. A control method for a head-mounted device, applied to the head-mounted device, the control method comprising:
sending a rendering request containing posture data to a cloud server, and receiving a first rendered image, wherein the first rendered image is an image obtained by rendering in the cloud server based on the posture data;
obtaining posture change data from a first target time to a second target time, wherein the first target time is a time when the rendering request is sent, and the second target time is a time when the first rendered image is received; and
performing rendering compensation on the first rendered image based on the posture change data to obtain a second rendered image,
wherein the posture change data is a rotation angle of the head-mounted device from the first target time to the second target time, and
wherein performing rendering compensation on the first rendered image based on the posture change data to obtain the second rendered image comprises calculating a rotation matrix based on the rotation angle, and adjusting the first rendered image using the rotation matrix to obtain the second rendered image,
wherein obtaining the posture change data from the first target time to the second target time comprises recording angular velocity data from the first target time to the second target time and conducting integral operation on the angular velocity data to obtain the rotation angle of the head-mounted device from the first target time to the second target time, and
wherein the first rendered image has the same image content range as that of the second rendered image.

2. The control method for a head-mounted device of claim 1, wherein the first rendered image is an image obtained by rendering in the cloud server based on an expanded image content range, and the expanded image content range is a range obtained by expanding an image content range corresponding to the posture data, and
wherein performing rendering compensation on the first rendered image based on the posture change data to obtain the second rendered image comprises: determining a target image content range based on the posture data and the rotation angle and extracting the second rendered image from the first rendered image according to the target image content range.

3. The control method for a head-mounted device of claim 2, wherein the expanded image content range is a range obtained by expanding the image content range corresponding to the posture data by a target length in each direction.

4. The control method for a head-mounted device of claim 3, wherein the target length is a length calculated according to a maximum delay between the head-mounted device and the cloud server, a maximum rotation speed of the head-mounted device and a rendering speed of the cloud server.

5. The control method for a head-mounted device of claim 1, further comprising performing asynchronous time warp (ATW) compensation on the second rendered image to obtain a third rendered image, and displaying the third rendered image through the head-mounted device at a third target time.

6. A head-mounted device, comprising:
a memory for storing a computer program; and
a processor for performing steps of the control method for a head-mounted device of claim 1 when executing the computer program.

7. A computer-readable storage medium, wherein a computer program is stored on the computer-readable storage medium, wherein when the computer program is executed by a processor, steps of the control method for a head-mounted device of claim 1 are implemented.

8. A control apparatus for a head-mounted device, applied to the head-mounted device, the control apparatus comprising a processor, the processor being configured to:
send a rendering request containing posture data to a cloud server and receive a first rendered image, wherein the first rendered image is an image obtained by rendering in the cloud server based on the posture data;
obtain posture change data from a first target time to a second target time, wherein the first target time is a time when the rendering request is sent, and the second target time is a time when the first rendered image is received; and
perform rendering compensation on the first rendered image based on the posture change data to obtain a second rendered image,
wherein the posture change data is a rotation angle of the head-mounted device from the first target time to the second target time,
wherein performing rendering compensation on the first rendered image based on the posture change data to obtain the second rendered image comprises calculating a rotation matrix based on the rotation angle, and adjusting the first rendered image using the rotation matrix to obtain the second rendered image,
wherein obtaining the posture change data from the first target time to the second target time comprises recording angular velocity data from the first target time to the second target time and conducting integral operation on the angular velocity data to obtain the rotation angle of the head-mounted device from the first target time to the second target time, and
wherein the first rendered image has the same image content range as that of the second rendered image.

* * * * *